United States Patent [19]

Tulpule

[11] 4,085,450
[45] Apr. 18, 1978

[54] PERFORMANCE INVARIENT EXECUTION UNIT FOR NON-COMMUNICATIVE INSTRUCTIONS

[75] Inventor: Bhalchandra Ramchandra Tulpule, Storrs, Conn.

[73] Assignee: Burroughs Corporation, Detroit, Mich.

[21] Appl. No.: 755,360

[22] Filed: Dec. 29, 1976

[51] Int. Cl.² .............................. G06F 7/38; G06F 9/18
[52] U.S. Cl. ..................................... 364/900; 364/716
[58] Field of Search ............................ 235/156, 164

[56] References Cited

U.S. PATENT DOCUMENTS

| | | | |
|---|---|---|---|
| 3,252,149 | 5/1966 | Weida et al. | 364/200 |
| 3,564,226 | 2/1971 | Seligman | 235/164 |
| 3,689,895 | 9/1972 | Kitamura | 364/200 |
| 3,840,861 | 10/1974 | Amdahl et al. | 364/200 |
| 3,887,799 | 6/1975 | Lindgren | 235/164 |
| 3,932,845 | 1/1976 | Beriot | 364/900 |
| 3,953,833 | 4/1976 | Shapiro | 364/200 |

OTHER PUBLICATIONS

D. Sofer et al., "Parallel Pipeline Organization of Execution Unit", in IBM Tech. Discl. Bull., vol. 14, No. 10, Mar. 1972, pp. 2930–2933.

Primary Examiner—Melvin B. Chapnick
Attorney, Agent, or Firm—Edward J. Feeney, Jr.; Edmund M. Chung; Leonard C. Brenner

[57] ABSTRACT

An arithmetic processor includes an input buffer and a result buffer connected through a pair of multiplexers to a pair of working registers feeding three parallel execution units. Operands stored in the buffers are selected for processing by addressing the buffers and multiplexers. Instruction overlapping is provided whereby operands of one instruction are read in parallel with the execution of the previous instruction. Further, reverse operations are processed identically as forward or normal operations except for addressing thereby achieving invarience of performance under non-communicative instructions.

5 Claims, 4 Drawing Figures

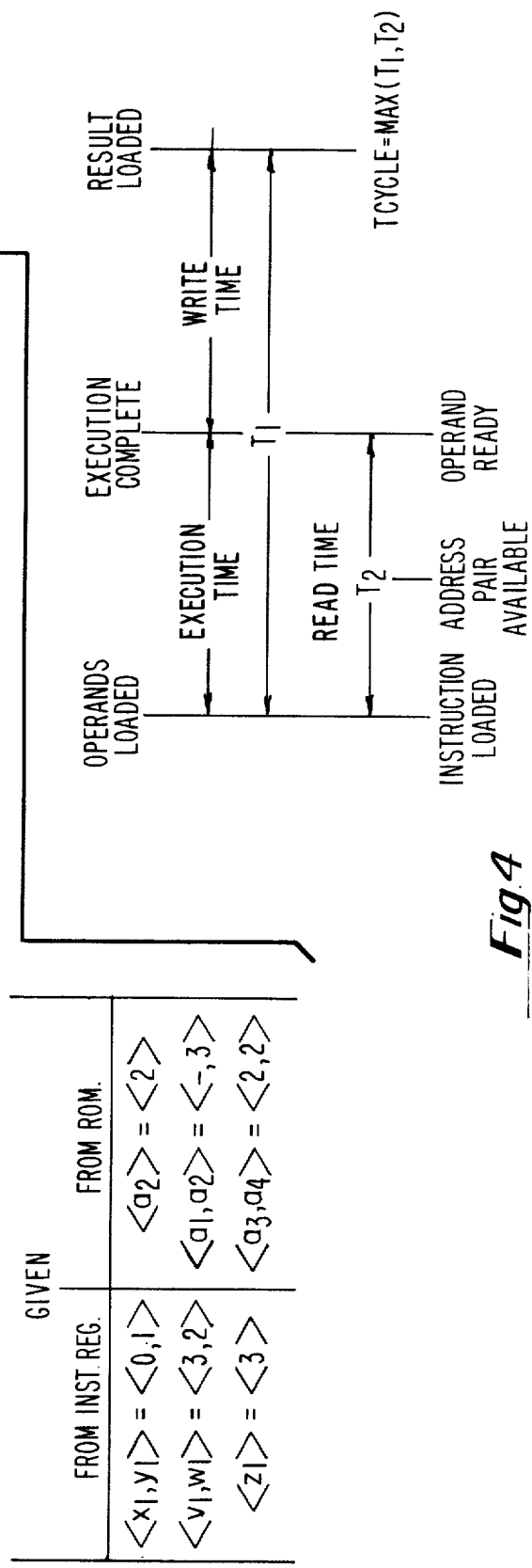

PERFORMANCE INVARIENT EXECUTION UNIT FOR NON-COMMUNICATIVE INSTRUCTIONS

BACKGROUND OF THE INVENTION

The present invention relates to the architectural design of execution units for data processors and more particularly, to the design of a high speed performance invarient execution unit for non-communicative instructions. The designers of high speed computers are frequently confronted with the task of optimizing the overall performance of arithmetic processors by minimizing the execution time of an instruction, the execution time being the product of the number of steps involved and the cycle time of the processors.

A common approach to the design of an efficient arithmetic processor is to partition the execution into several units each performing a unique task. This approach speeds up the individual units and reduces hardware overhead. Instructions are executed as algorithms with the results of each step being collected from one or more execution unit(s).

In operation an architecture having parallel execution units would begin by reading operands from input buffer storage or the like and then properly multiplexing the operands into the selected execution unit(s) for execution. Following execution, the result would be bussed from the execution unit(s) and written into a buffer storage.

The inefficiencies of such an architecture is apparent since while the operands are being fetched and multiplexed, the execution units are idle. Furthermore, the read time is adversely affected by the presence of "reverse" instructions. A reverse instruction, is denoted by an apostrophe symbol over the instruction symbol. For example, the reverse instruction A-'B is in result the same as the "forward" or normal instruction B - A. To efficiently execute reverse instructions the read address of both operands ("A" and "B" in the example above) must be interchanged thereby increasing cycle time further.

OBJECTS AND SUMMARY OF THE INVENTION

It is therefore an object of the present invention to provide an improved high speed execution portion of an arithmetic processor.

It is another object of the invention to provide an arithmetic processor for facilitating the reading of operands of one instruction in parallel with the execution of the previous instruction.

It is still another object of the invention to provide an arithmetic processor having invarient performance under noncommunicative instructions.

The above and other objects of the present invention are achieved by an architecture having an input operand storing buffer and a result operand storing buffer associated via a pair of multiplexers to a pair of working registers feeding three parallel execution units. Operands stored in the buffers are selected for processing by addressing the buffers and multipliers. The operation to be performed is specified by an operation code supplied to each execution unit. Reverse operations are performed as forward or normal operations by mere addressing manipulation.

DESCRIPTION OF THE DRAWINGS

The features of this invention will become more fully apparent from the following detailed description, attached claims and accompanying drawings in which like characters refer to like parts and in which:

FIG. 3 is a tabular presentation of the execution of an illustrative four step instruction by the circuitry of FIGS. 1 and 2; and FIG. 4 is a timing diagram illustrating the parallel execution and reading of operands by the architecture of the present invention.

DETAILED DESCRIPTION OF THE PREFERRED EMBODIMENT

Figure 1:
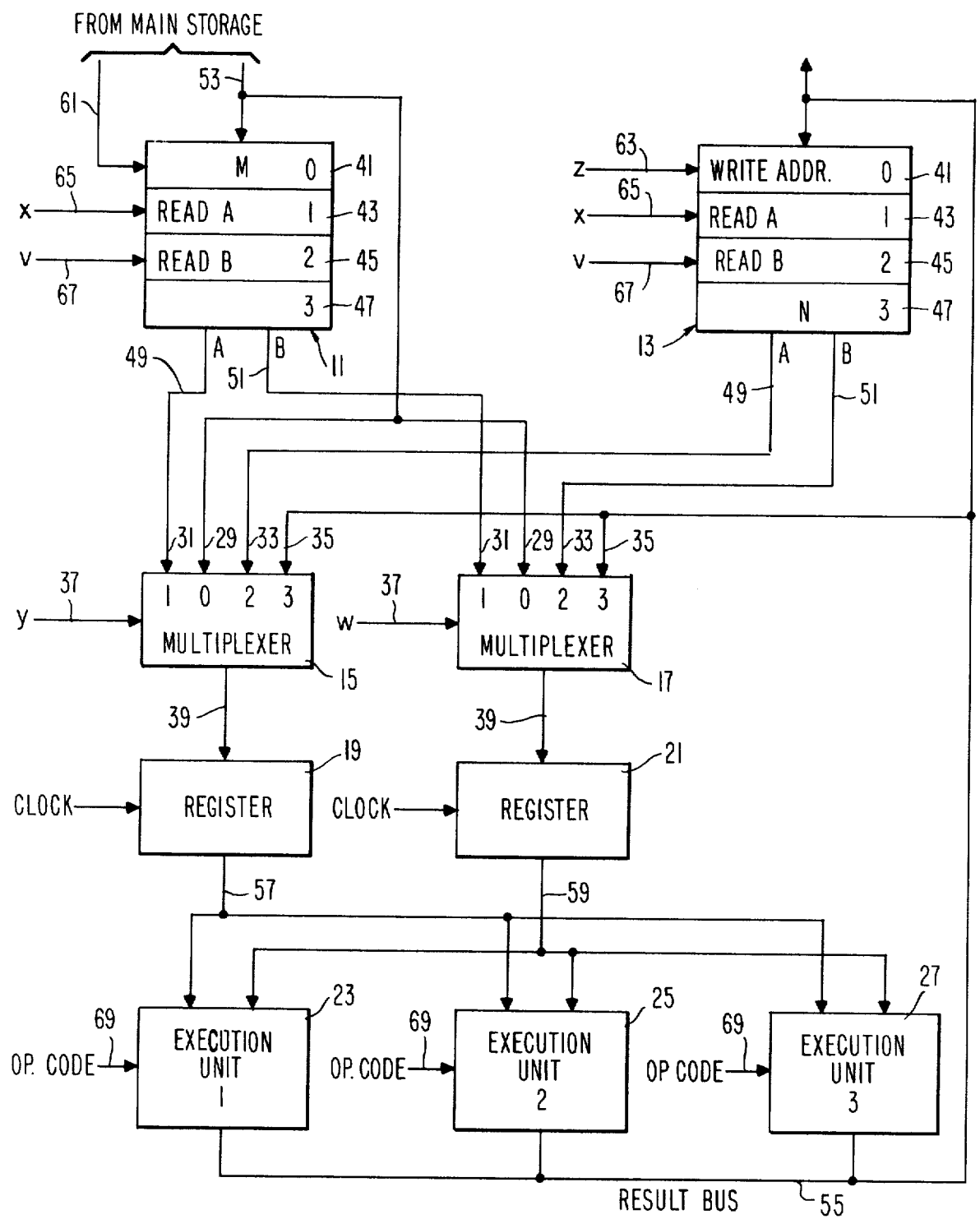
FIG. 1 is a detailed block diagram of the execution unit architecture of the present invention.

The preferred embodiment of the present invention, see FIG. 1, includes a first and a second two-port file circuit, 11 and 13 respectively, a first and a second four-input multiplexer, 15 and 17 respectively, a first and second working register 19 and 21 respectively, and three execution units 23, 25 and 27. An important feature of the present invention involves the interconnection pattern of the above-cited elements and in particular the interconnection pattern to multiplexers 15 and 17.

Each multiplexer 15 and 17 has four ordered input channels 29, 31, 33 and 35 respectively, and an address input 37 to specify which of the input channels is to be in effect, fed through to an output channel 39. Each file circuit 11 and 13 includes four ordered registers 41, 43, 45 and 47 respectively, an A port 49 and a B port 51. The contents of any of the four ordered registers 41, 43, 45 and 47 are available at either the A port 49 or the B port 51 under the control of the file circuit addressing X line 65 and V line 67. The A port 49 of file circuit 11 is connected to the input channel 31 of multiplexer 17. Likewise, the A port 49 and the B port 51 of the file circuit 13 are connected respectively to the input channels 33 of the multiplexers 15 and 17. An input data path 53 feeding the file circuit 11 also is inputted into the input channels 29 of multiplexers 15 and 17. A common result bus 55 feeds the file circuit 13 and is also inputted into the input channels 35 of the multiplexers 15 and 17.

The output channel 39 of multiplexer 15 feeds the first working register 19 which in turn feeds through a common bus 57 to the three execution units 23, 25, 27. Likewise, the output channel 39 of multiplexer 17 feeds the second working register 21 which in turn feeds through a common bus 59 to the three execution units 23, 25 and 27.

In an arithmetic process, operands are fed via the data path 53 to the file circuit 11 and subsequently generated resultant operands are fed via the result bus 55 to the file circuit 13. Data is fed into file circuit 11 via input data path 53 and is written therein into one of the four registers 41, 43, 45 or 47 as designated on an input write address path 61. It is appreciated that the data and addressing information fed to file circuit 11 on paths 53 and 61 are originated external to the circuits of the present invention and may, as is generally practiced in the art, be stored in a memory (not shown) or the like prior to transmission to the file circuit 11. Likewise, the result bus 55 feeds data from the execution units 23, 25, and 27 to the file circuit 13 and into one of the registers 41, 43, 45 or 47 thereof as addressed by a "z" write address input 63. As desired, the result bus 55 may also feed data back to the main or secondary storage or to other data processing elements as desired.

Data in the file registers 41, 43, 45 and 47 may be read from the A port 49 as addressed by an "x" read address 65 which selects the particular register therefrom to be read. Likewise, a "V" read address input 67 selects a particular file register to be read from B port 51.

Let $<x,y>$ denote an ordered pair of the address lines $x$ and $y$. Using like notation it may be seen (FIG. 1) that $<x,y>$ and $<v,w>$ completely specify the data to be clocked from the file circuits 11 and 13 to the working registers 19 and 21. Consider a processing operation wherein input operands are stored in file circuit 11 and partial resultant operands stored in file circuit 13. An instruction may then be defined as follows:

$$<x,y> \text{ op } <v,w> \rightarrow z$$

where $<x,y>$ and $<v,w>$ are the left and right operand address pairs respectively, and $z$ is the result address. The operation (op) to be performed is specified on an operation code input 69 for each of the execution units 23, 25, and 27. The operation to be performed may be, for example, an arithmetic operation such as ADD, SUBSTRACT, MULTIPLY or DIVIDE. A specific code will instruct the execution unit to perform a specific operation.

With the above apparatus a typical single cycle is specified as follows:

$$M \text{ op } N \rightarrow z$$

where $M$ and $N$ is data stored in the file circuits 11 and 13 and resultant $z$ is to be stored in file circuit 13 at, for example, the third register 45. Thus, the instruction may be written as:

$$<0,1> \text{ op } <3,2> \rightarrow z$$

and the "reverse" instruction $$M \text{ op}' N \rightarrow z$$

can be implemented by merely interchanging the address pairs $<0,1>$, $<3,2>$ and performing the nomal operation.

Thus a single cycle instruction, normal or reverse, can be performed by the same execution unit (23, 25 or 27) by merely interchanging the address pairs. To extend this capability to general instructions the operand address must be stored and the correct address pairs selected for each cycle of operation, see FIG. 2. Execution begins when an instruction word comprising all information required to perform the instruction is loaded into an instruction register 71. The operand address pairs $x_1 y_1$ and $v_1 w_1$, are fed through multiplexers 73 and 75 to registers 77 and 79 dependent upon the "reverse" instruction bit R which controls the multiplexers 73 and 75. With continued reference to FIG. 2, it can be seen that the address pairs are gated into the registers 77 and 79 on the first instruction cycle (F) by AND gates 101 and 103, each AND gate driven by a clock input and a F input, the F input thereof being at a logical one (1) level during the first instruction cycle. The proper address pairs $<x,y>$ and $<v,w>$ are then selected from a variety of address pairs availabe for each cycle, such as the present and past operand address pairs and the present result address $<z_1 0>$.

The instruction code portion 85 of the instruction word stored in the instruction register 71 is fed through a multiplexer 87 to a read-only memory (ROM) 89. The instruction code 85 initiates a sequence of microwords stored in the ROM 89 which specifies for each cycle of operation the instruction dependent addresses, control bits M1, M2 and M3, the first cycle bit F, and the addresses of the next microword. The write address for each cycle is selected by M3 from the result address $z_1$ and the instruction specified address $z_2$. The selected address is then loaded into a register 91.

Figure 2:
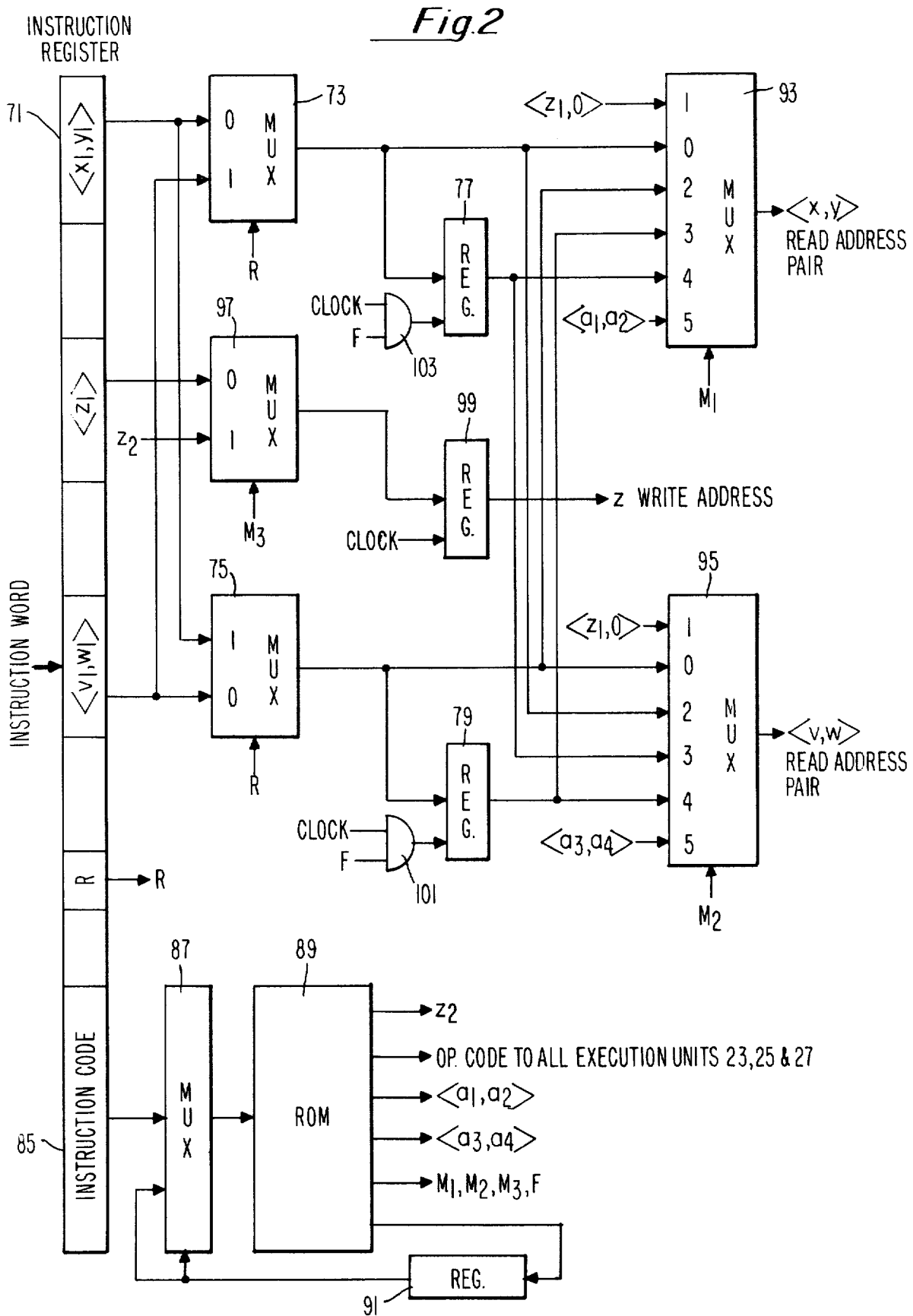
FIG. 2 is a detailed block diagram of an instruction register and associated circuitry used to generate addresses and other data for the architecture of FIG. 1.

With continued reference to FIG. 2, it is appreciated that control bit M1 from ROM 89 controls a multiplexer 93 to select and read address pair $<x,y>$, control bit M2 controls a multiplexer 95 to select a write address pair $<v,w>$ and control bit M3 controls a multiplexer 97 feeding a clocked register 99 to select a write address $<z>$. Further, reverse bit R from the instruction register 71 controls multiplexers 73 and 75. Finally, the "first bit" F from ROM 89 is fed to AND gate 101 to clock register 79 and to AND gate 103 to clock register 77.

The performance of the present invention may be better understood by considering the execution of the following instruction of four steps:

1. $M \text{ op}_1 M \rightarrow z_1$

2. $M \text{ op}_2 z_1 \rightarrow z_2$

3. $z_2 \text{ op}_3 N \rightarrow z_3$

4. $z_1 \text{ op}_4 z_3 \rightarrow z_4$ where $M$ and $N$ are stored in the input buffer 11 and the result buffer 13 respectively, and the result $z$ is to be stored in the result buffer 13, see FIG. 1. The complete execution sequence for the above four step instruction and its reverse is shown in tabular form in FIG. 3. Note that to perform a reverse instruction such as $M \text{ op}' N$, $M$ and $N$ are merely interchanged and the normal operation performed. It is evident then that an instruction may be performed either normally or reverse in the same time. Thus, the execution is described as performance invarient for non-communicative instructions.

In operation, the operation of any instruction begins with the loading of the working registers 19 and 21, see FIG. 1. The operands are processed by the execution unit 23, 25 and 27 as required and the result therefrom is written into the result buffer 13 or the working registers 19 and 21 as selected. Referring now to FIG. 4, let $T_1$ be the time taken for the execution and writing of operands. In parallel with the execution of a step, the operand address pairs are selected, the buffers 11 and 13 are addressed and the proper operands are selected for loading into working registers 19 and 21. With $T_2$ being equal to the time required for the above-described reading-in of operands, the cycle time $T_c$ is given by:

$$T_c = \max(T_1, T_2).$$

Thus, it is seen that significant improvement in cycle time is achieved by reading operands in parallel with the generation and writing of results. With the instruction execution being performed in parallel with the reading of operands, complete overlapping of two instructions is possible thereby not only increasing throughput but also permitting compiler simplification without loss of performance since fewer store cycles are required. For example, the problem $A/(B-C/D)$ may be written in reverse operation notation as $C/D -$ $'B/'A$ to avoid one store per each reverse operation. Thus, in this example, store cycles $C/D \rightarrow z_1$, $B - z_1 \rightarrow z_2$ and $A/z_2 \rightarrow z_3$ are all avoided. It is obvious that similar store cycle elimination benefits would accrue in many other problems run on the architecture of the present invention.

It will be appreciated that while only specific embodiments of the present invention and methods of practicing the same have been described and illustrated, changes and modifications therein will be apparent to one skilled in the art, which changes and modifications will nevertheless be within the spirit and scope of the invention as claimed.

What is claimed is:

1. A performance invarient execution apparatus for non-communicative instructions comprising:
    a first and a second addressable operand file, each having a first and a second output port;
    a first multiplexer inputted by said first output ports of said first and second operand file;
    a second multiplexer inputted by said second output ports of said first and said second operand file;
    a first and a second working register inputted respectively by said first and said second multiplexer;
    a plurality of execution units, each execution unit therein inputted by both said first and said second working register and each execution unit thereof having an operation code input for receiving an operation code specifying an operation to be executed;
    a common bus for transferring outputs from said plurality of execution units to said second addressable operand file;
    means for addressably writing from said common bus into said second addressable operand file;
    first operand means for reading an operand into said first working register, said first operand means addressing in parallel said first and second addressable operand files for reading operands in parallel from said first ports thereof, and addressing said first multiplexer for selecting operand passage therethrough to said first working register; and
    second operand means for reading an operand into said second working register, said second operand means addressing in parallel said first and said second addressable operand files for reading operands in parallel from said second ports thereof, and addressing said second multiplexer for selecting operand passage therethrough to said second working register.

2. The performance invarient execution apparatus according to claim 1 wherein said common bus also transfers outputs from said plurality of execution units to said first and said second multiplexers.

3. The performance invarient execution apparatus according to claim 1 wherein said plurality of execution units equals three execution units.

4. The performance invarient execution apparatus according to claim 1 further including:
    operand unit means for providing operands to said first addressable operand file.

5. The performance invarient execution apparatus according to claim 4 wherein said operand unit means also provides operands directly to said first and second multiplexer.

* * * * *